United States Patent
Merker et al.

(10) Patent No.: US 10,558,661 B2
(45) Date of Patent: Feb. 11, 2020

(54) QUERY PLAN GENERATION BASED ON TABLE ADAPTER

(71) Applicant: SAP SE, Walldorf (DE)

(72) Inventors: Till Merker, Sandhausen (DE); Joerg Fellmann, Nussloch (DE)

(73) Assignee: SAP SE, Walldorf (DE)

( * ) Notice: Subject to any disclaimer, the term of this patent is extended or adjusted under 35 U.S.C. 154(b) by 203 days.

(21) Appl. No.: 15/364,004

(22) Filed: Nov. 29, 2016

(65) Prior Publication Data
US 2018/0150517 A1    May 31, 2018

(51) Int. Cl.
| G06F 17/30 | (2006.01) |
| G06F 16/2453 | (2019.01) |
| G06F 16/22 | (2019.01) |
| G06F 16/2455 | (2019.01) |

(52) U.S. Cl.
CPC .... G06F 16/24542 (2019.01); G06F 16/2282 (2019.01); G06F 16/24554 (2019.01)

(58) Field of Classification Search
CPC ........ G06F 17/30463; G06F 17/30486; G06F 17/30339; G06F 16/24542; G06F 16/24554; G06F 16/2282
See application file for complete search history.

(56) References Cited

U.S. PATENT DOCUMENTS

| 5,918,225 A | 6/1999 | White et al. |
| 6,374,236 B1 | 4/2002 | Chen et al. |
| 7,174,553 B1 | 2/2007 | Reed et al. |
| 7,337,174 B1* | 2/2008 | Craig ................ G06F 17/30914 |
| 7,797,342 B2 | 9/2010 | Banks et al. |
| 7,805,456 B2 | 9/2010 | Meijer et al. |
| 8,977,600 B2 | 3/2015 | Crupi et al. |
| 9,165,021 B2 | 10/2015 | Bhattacharjee et al. |
| 9,298,768 B2 | 3/2016 | Varakin et al. |
| 9,495,207 B1 | 11/2016 | Pjesivac-Grbovic et al. |
| 10,152,511 B2 | 12/2018 | Rajan et al. |

(Continued)

FOREIGN PATENT DOCUMENTS

EP    2930629    10/2015

OTHER PUBLICATIONS

Herodotos Herodotou et al., Query Optimization Techniques for Partitioned Tables, Jun. 2011, SIGMOD'11: Proceedings of the 2011 ACM SIGMOD International Conference on Management of Data, pp. 49-60 (Year: 2011).*

(Continued)

*Primary Examiner* — Greta L Robinson
(74) *Attorney, Agent, or Firm* — Mintz Levin Cohn Ferris Glovsky and Popeo, P.C.

(57) ABSTRACT

In some aspects, there is provided a method for database query execution planning using table adapters. In some aspects, a method may include receiving, at a database execution engine, a query; generating, by the database execution engine, a query plan for execution of the query, the query requiring access to at least one table; calling, by the database execution engine, a table adapter to prepare at least one table object to enable access, during runtime, to the at least one table; and receiving, by the database execution engine, the at least one table object prepared by the table adapter. Related systems, methods, and articles of manufacture are also described.

20 Claims, 5 Drawing Sheets

(56) References Cited

U.S. PATENT DOCUMENTS

| | | |
|---|---|---|
| 2001/0037322 A1 | 11/2001 | Lindsay et al. |
| 2002/0035559 A1 | 3/2002 | Crowe et al. |
| 2004/0015511 A1 | 1/2004 | Seefeldt et al. |
| 2004/0078364 A1 | 4/2004 | Ripley et al. |
| 2004/0162822 A1 | 8/2004 | Papanyan et al. |
| 2004/0230559 A1* | 11/2004 | Newman ............... G06F 16/25 |
| 2005/0028134 A1 | 2/2005 | Zane et al. |
| 2005/0080755 A1* | 4/2005 | Aoyama ........... G06F 17/30569 |
| 2005/0138000 A1 | 6/2005 | Roux et al. |
| 2007/0239797 A1* | 10/2007 | Cattell ............. G06F 17/30306 |
| 2007/0250470 A1 | 10/2007 | Duffy et al. |
| 2008/0033960 A1* | 2/2008 | Banks ............... G06F 17/30595 |
| 2008/0098053 A1 | 4/2008 | Miao et al. |
| 2008/0281786 A1 | 11/2008 | Duffy et al. |
| 2008/0281846 A1 | 11/2008 | Hoang et al. |
| 2009/0006429 A1 | 1/2009 | Champion et al. |
| 2009/0030874 A1 | 1/2009 | Das et al. |
| 2009/0228434 A1 | 9/2009 | Krishnamurthy et al. |
| 2010/0262633 A1 | 10/2010 | Bhattacharjee et al. |
| 2010/0281017 A1 | 11/2010 | Hu et al. |
| 2011/0066668 A1* | 3/2011 | Guarraci ........... G06F 17/30233 |
| | | 707/831 |
| 2012/0084315 A1* | 4/2012 | Schneider ......... G06F 16/24558 |
| | | 707/769 |
| 2013/0054630 A1 | 2/2013 | Briggs et al. |
| 2013/0073573 A1 | 3/2013 | Huang et al. |
| 2013/0151502 A1 | 6/2013 | Yoon et al. |
| 2014/0010861 A1 | 1/2014 | Bancel et al. |
| 2014/0081950 A1 | 3/2014 | Rajan et al. |
| 2014/0089294 A1 | 3/2014 | Shankar et al. |
| 2014/0108861 A1 | 4/2014 | Abadi et al. |
| 2014/0172914 A1 | 6/2014 | Elnikety et al. |
| 2014/0280030 A1 | 9/2014 | Freedman et al. |
| 2014/0280037 A1 | 9/2014 | Petride et al. |
| 2014/0351233 A1 | 11/2014 | Crupi et al. |
| 2015/0026154 A1 | 1/2015 | Jeong et al. |
| 2015/0178305 A1 | 6/2015 | Mueller et al. |
| 2015/0186461 A1 | 7/2015 | Nica |
| 2015/0193500 A1 | 7/2015 | Aute et al. |
| 2015/0261820 A1 | 9/2015 | Cheng et al. |
| 2015/0269228 A1 | 9/2015 | Fisher et al. |
| 2017/0024433 A1 | 1/2017 | Neelakanthappa et al. |
| 2017/0228425 A1 | 8/2017 | Kandula et al. |
| 2017/0262516 A1 | 9/2017 | Horowitz et al. |
| 2017/0308547 A1* | 10/2017 | Gupta ............... G06F 17/30194 |
| 2018/0150513 A1 | 5/2018 | Willems et al. |
| 2018/0150514 A1 | 5/2018 | Willems et al. |
| 2018/0150515 A1 | 5/2018 | Merker et al. |

OTHER PUBLICATIONS

Herodotos Herodotou et al., Query Optimization Techniques for Partitioned Tables, Jun. 2011, SIGMOD'11: Proceedings of the 2011 ACM SIGMOD International Conference on Management of Data, pp. 49-60 (Year: 2011) (Year: 2011).*

Neumann, Thomas. "Efficiently compiling efficient query plans for modern hardware." Proceedings of the VLDB Endowment 4.9 (2011): 539-550.

* cited by examiner

QUERY PLAN GENERATION BASED ON TABLE ADAPTER

TECHNICAL FIELD

The subject matter described herein relates to database management, and more particularly, query execution planning.

BACKGROUND

Database management systems have become an integral part of many computer systems. For example, some systems handle hundreds if not thousands of transactions per second. On the other hand, some systems perform very complex multidimensional analysis on data. In both cases, the underlying database may need to handle responses to queries very quickly in order to satisfy systems requirements with respect to transaction time. Given the complexity of these queries and/or their volume, the underlying databases face challenges in order to optimize performance.

SUMMARY

In one aspect, a method, computer program product and system are provided for query execution planning.

In some aspects, there is provided a method including receiving, at a database execution engine, a query; generating, by the database execution engine, a query plan for execution of the query, the query requiring access to at least one table; calling, by the database execution engine, a table adapter to prepare at least one table object to enable access, during runtime, to the at least one table; and receiving, by the database execution engine, the at least one table object prepared by the table adapter.

In some variations, the operations can further include one or more features disclosed herein including the following. The query may be received from an application separate from the database execution engine. The query plan may be optimized by the database execution engine. The at least one table adapter may include metadata to enable access to the at least one table. The metadata may include a physical location of the at least one table. The metadata may include a quantity of partitions associated with storage of the at least one table. The metadata may include whether the at least one table is stored row-wise, whether the at least one table is stored column-wise, and whether one or more columns of the at least one table are dictionary encoded. The method may further include calling, during runtime, the at least one table object to open access to the at least one table and receiving, in response to open, the at least one table. The database execution engine may include a cache for execution of the at least one table object returned from the table adapter, a pre-compiled operation, and a code-generated operation. The database execution engine may be configured to provide query optimization of the query plan, combine, for query execution, the pre-compiled operation and the code-generated operation, and select other execution engines to handle certain queries. The at least one table adapter, rather than the database execution engine, may include information to enable opening access to the at least one table.

Implementations of the current subject matter can include systems and methods consistent with the present description, including one or more features as described, as well as articles that comprise a tangibly embodied machine-readable medium operable to cause one or more machines (e.g., computers, etc.) to result in operations described herein. Similarly, computer systems are also described that may include one or more processors and one or more memories coupled to the one or more processors. A memory, which can include a computer-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including but not limited to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to an enterprise resource software system or other business software solution or architecture, it should be readily understood that such features are not intended to be limiting. The claims that follow this disclosure are intended to define the scope of the protected subject matter.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

When practical, similar reference numbers denote similar structures, features, or elements.

DETAILED DESCRIPTION

Figure 1:
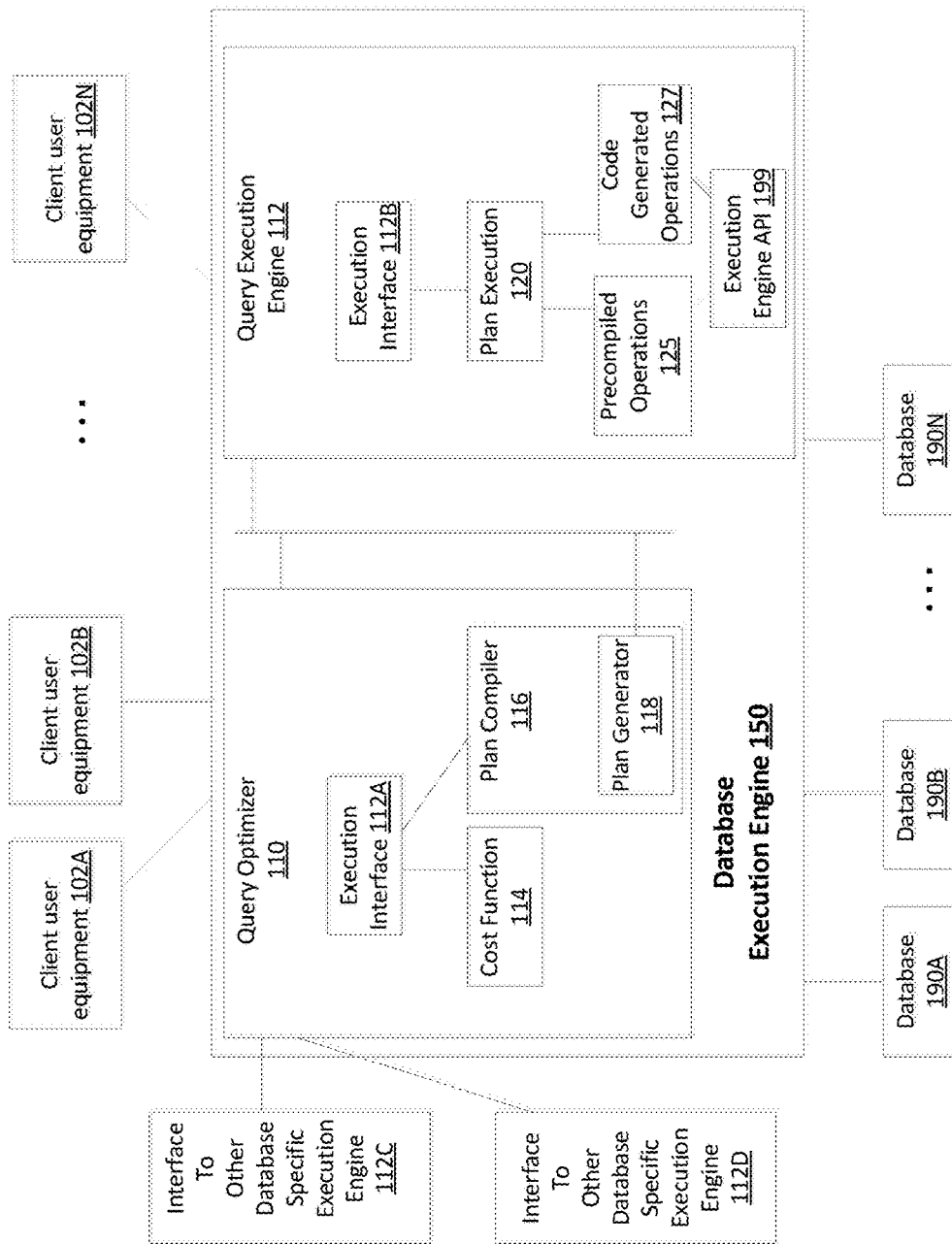
FIG. 1 depicts a block diagram for a system, in accordance with some example embodiments.

Database management systems and operations performed on the data managed by a database management system have become increasingly complex. For example, a database management systems (or database for short) can support relatively complex online analytical processing (OLAP, which can perform multi-dimensional analysis) to more straightforward transaction based online transaction processing (OLTP). Moreover, the database may be configured as a row-store database or column store database, each of which may have certain aspects with respect to queries and other operations at the database. For example, the database may encode data using dictionaries, while some databases may not. In addition to these various databases layer differences, the queries performed at a database can comprise a complex sequence of operations in order to generate corresponding responses. To implement the complex sequence, a query execution plan (or query plan for short) may be implemented. The query plan represents a sequence of operations, such as instructions, commands, and/or the like, to access data in the database. The database may also include a query plan optimizer to determine an efficient way to execute the query plan.

From an application or client perspective, it can be extremely cumbersome to access databases. For example, an application may need to query different types of databases using complex queries. As a consequence, the application layer in this example would need to be configured to handle the various types of databases and the various query types. Additionally or alternatively, each database may need to process queries from the application into a format and structure that can be handled by the given database. Pushing complex operations and support for a variety of different database types to the application layer may contravene the need to have relatively lighter weight and/or readily deployable applications. On the other hand, pushing complex operations to the database layer where data is stored may draw processing and/or memory resources at the database and may thus reduce the performance and response times for queries on that database layer.

In some example embodiments, there may be provided an execution engine that may decouple the higher-level, application layer from the database layer (e.g., the persistence or storage layer where data including database tables may be stored and/or queried using instructions, such as commands and/or the like). The execution engine may be implemented separately from the database layer and/or the application layer. Furthermore, the execution engine may be configured to receive a query, generate a query plan (including for example query algebra), optimize the query plan, and/or generate executable code, which can be executed at runtime. The executable code may include pre-compiled code (which can be selected for certain operations in the query plan) and/or code that is generated just-in-time specifically for execution of the query plan.

The execution engine may be configured to perform some operations itself, while the execution engine may send some operations (e.g., relatively basic commands, such as reads, writes, scans, and/or the like) to the database layer. Furthermore, the execution engine may receive corresponding responses from the database layer where data is stored/persisted and certain commands, such as reads, writes, scans, and/or the like, can be performed. The execution engine may perform more complex execution operations, such as rule-based operations including relatively more complex operations such as joins, projections, and/or the like, while accessing the database's storage/persistence layer when needed to read, write, update, and/or perform other operations.

The execution engine may be configured to support a wide range of database types to reduce, if not eliminate, the need for specialized execution engines for each type of database. For example, rather than having an execution engine for each type of database (e.g., an execution engine for an OLAP database, another execution engine for an OLTP database, an execution engine for a row-store database, an execution engine for a column-store database, and/or the like), the execution engine disclosed herein can perform query execution for a variety of database types and send queries to the different types of database layers (and/or their storage/persistence layer) and handle the corresponding responses.

FIG. 1 depicts an example of a system 100, in accordance with some example implementations.

The system 100 may include one or more user equipment 102A-N, such as a computer, a smart phone, a tablet, an Internet of Things (IoT) device, and/or other computer or processor-based devices. The user equipment may include a user interface, such as a browser or other application to enable access to one or more applications, database layer(s), and/or databases, to generate queries to one or more databases 190A-N, and/or to receive responses to those queries.

In the example of FIG. 1, the databases 190A represent the database layer of a database management system where data may be persisted and/or stored in a structured way, and where the data can be queried or operated on using operations including SQL commands or other types of commands/instructions to provide reads, writes, and/or perform other operations. To illustrate by way of an example, user equipment 102A-N may send a query via an execution engine 150 to the database layer 190A-B, which may represent a persistence and/or storage layer where database tables may be stored and/or queried. The query may be sent via a connection, such as a wired and/or wireless connection (e.g., the Internet, cellular links, WiFi links, and/or the like).

The database execution engine 150 may include a query optimizer 110, such as a SQL optimizer and/or another type of optimizer, to receive at least one query from a user equipment and generate a query plan (which may be optimized) for execution by the execution engine 112. The query optimizer 110 may receive a request, such as a query, and then form or propose an optimized query plan. The query plan (which may be optimized) may be represented as a so-called "query algebra" or "relational algebra."

For example, SELECT Columns from Table A and Table B, and perform an INNER JOIN on Tables A and B may represent a query received by the database execution engine 150 including the query optimizer 110. There may be several ways of implementing execution of this query. As such, the query plan may offer hints or propose an optimum query plan with respect to the execution time of the overall query. To optimize a query, the query plan optimizer 110 may obtain one or more costs for the different ways the execution of the query plan can be performed. The costs may be obtained via the execution interface 112A from a cost function 114, which responds to the query optimizer 110 with the cost(s) for a given query plan (or portion thereof), and these costs may be in terms of execution time at the database layer 190A-N, for example.

The query optimizer 110 may form an optimum query plan, which may represent a query algebra, as noted above. To compile a query plan, the query optimizer 110 may provide the query plan to the query plan compiler 116 to enable compilation of some, if not all, of the query plan. The query plan compiler 116 may compile the optimized query algebra into operations, such as program code and/or any other type of command, operation, object, or instruction. This code may include pre-compiled code (which can be pre-compiled and stored, and then selected for certain operations in the query plan) and/or just-in-time code generated specifically for execution of the query plan. For example, plan compiler may select pre-compiled code for a given operation as part of the optimization of the query plan, while for another operation in the query plan the plan compiler may allow a compiler to generate the code. The pre-compiled and generated code represent code for executing the query plan, and this code may be provided to the plan generator 118, which interfaces the query execution engine 112.

In some implementations, the query optimizer 110 may optimize the query plan by compiling and generating code. Moreover, the query optimizer 110 may optimize the query plan to enable pipelining during execution.

In some implementations, the query optimizer 110 may be configured to select other execution engines. For example, the query optimizer 110 may select via interface 112C an execution engine configured specifically to support a row-store database or an ABAP type database, or the query optimizer 110 may select via interface 112D an execution engine configured specifically to support a column-store type database. In this way, the query optimizer 110 may select whether to use the universal database execution engine 150 or legacy (e.g., database-specific) execution engines (available via interfaces 112C/D, for example).

The query execution engine 112 may receive, from the plan generator 118, compiled code to enable execution of the optimized query plan, although the query execution engine may also receive code or other commands directly from a higher-level application or other device, such as user equipment 102A-N.

The query execution engine 112 may then forward, via an execution interface 112B, the code to a plan execution engine 120. The plan execution engine may then prepare the plan for execution, and this query plan may include pre-compiled code 125 and/or generated code 127. When the code for the query plan is ready for execution during runtime, the query execution engine 112 may step through the code performing some of the operations within the database execution engine 150 and sending some of the operations (or commands in support of an operation, such as a read, write, and/or the like) to the execution engine application programming interface (API) for execution at one or more of databases layers 190A-N.

Table 1 below depicts an example of a query execution plan including a (1) TableScan (Filter X=1) and a (2) Materialization (Columns A, B). In this example, the TableScan would result in one or more calls via the execution engine API 199 to one or more of databases 190A-B. Specifically, the TableScan operator at Table 1 would result in a call for a dictionary look up for a column "X" for the value ID of "1" and an indexvector scan with a valueid obtained from the dictionary look up, which results in a document ID list that identifies one or more rows in the table 1. Then for each document ID, a call is made via 199 to look up the value IDs for columns A and B. The value IDs may be used to look up dictionary values to materialize, the columns A and B including the actual data values for those columns.

TABLE 1

| Operator | Calls made on Database API |
| --- | --- |
| 1) TableScan (Filter X = 1) | dictionary lookup column "X" for the value of ID of "1"<br>indexvector scan with a valueid from the lookup, which results in a document ID (docid) list that identifies one or more rows in table "1". |
| 2) Materialization (Columns A, B) | For each docid, lookup value IDs (valueids for columns A + B<br>For the valueids, lookup dictionary value in dictionaries of A and B |

In some implementations, the query execution engine 150 may, as noted, be configured to handle different types of databases and the corresponding persistent layers and/or tables therein. For example, the database 190N may be implemented as a row-oriented database, so that an insert is performed by adding a row with a corresponding row identifier, while another database 190A may be implemented as a column store database, which may use dictionaries and compressive techniques when inserting data into a table. In this example, the query execution engine 150 may perform execution related to handling the differences between these two types of databases. This may enable a reduction in processing at the database layer 190A-N. Moreover, the query execution engine 150 may perform other operations including rule-based operations, such as joins and projections, as well as filtering, group by, multidimensional analysis, and/or the like to reduce the processing burden on the database layer. In this way, the query execution engine 150 may execute these and other complex operations, while the database's persistence/storage layer 190A-N can perform simpler operations to reduce the processing burden at the database's persistence/storage layer 190A-N.

In some example embodiments, the query execution engine 150 may run, as noted above, just-in-time code 127 generated for some query operations, while pre-compiled code 125 may be run for other operations. Moreover, the query execution engine 150 may combine the generated code 127 with pre-compiled code 125 to further optimize execution of query related operations. In addition, the query execution engine 150 may provide for a plan execution framework that is able to handle data chunk(s), pipelining, and state management during query execution. Furthermore, the query execution engine 150 may provide the ability to access table storage via an abstract interface to a table adapter, which may reduce dependencies on specific types of storage/persistence layers (which may enable use with different types of storage/persistence layers).

In some example embodiments, the database execution engine 150 may be provided with at least one table adapter. In some example embodiments, the table adapter may generate an object, such as a table object, which can be stored in cache with other code, objects, and/or the like awaiting runtime execution of the query. In some example embodiments, and the table object can be opened, during query execution, to provide access to a table stored in the persistence layer of a database.

Figure 2A:
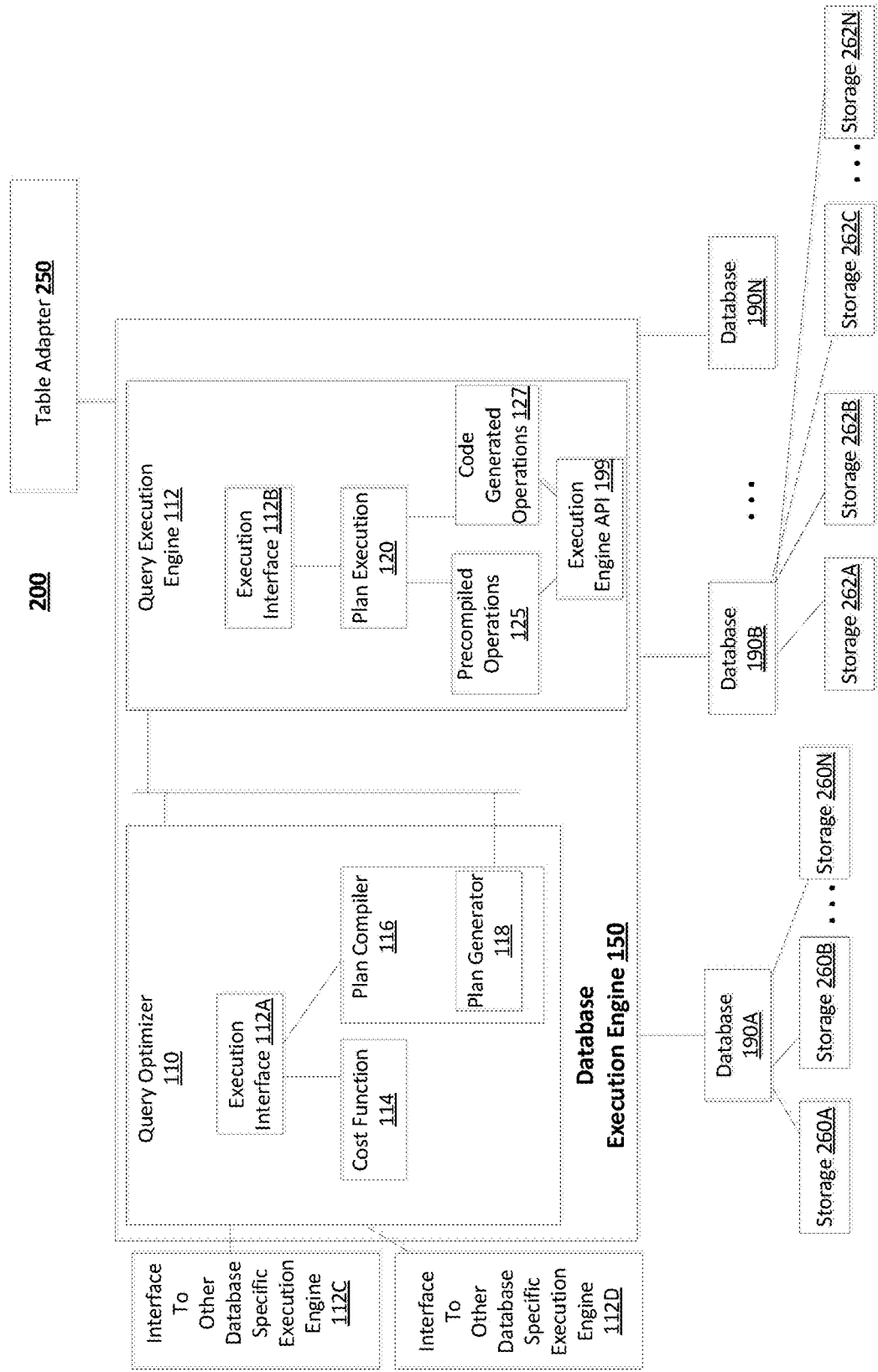
FIG. 2A depicts another block diagram for a system, in accordance with some example embodiments.

FIG. 2A depicts a system 200 including a table adapter 250, in accordance with some example embodiments. The system 200 is similar to system 100 in some respects but further depicts the table adapter 250, as well as the storage 260A-N and storage 262A-N. Although FIG. 2A depicts a single table adapter 250, in some example embodiments, there may be a plurality of table adapters. For example, each table at the database layer may have a corresponding table adapter that can be called by the database execution engine 150.

In some example embodiments, the table adapter 250 may be implemented separate from the database's 190A-N including the persistence or storage 260A-N and 262A-N. Moreover, the table adapter 250 may be implemented separate from the client layer, such as user equipment 102A-N.

In some example embodiments, the database execution engine 150 may access the table adapter 250 to prepare and return a table object, which when opened during runtime can provide access to a table stored at the database's persistent layer (e.g., at 190A or 260A-N).

In some example embodiments, a database table (also referred to herein as a table) may be partitioned among storage devices, such as storage 260A-C. To illustrate further, a database table may be partitioned so that a first column is stored in storage device 260A and other columns are stored in storage device 260B. In some implementations, the use of partitioning may improve performance including transaction times. In the case of database 190A being an in-memory database for example, the storage 260A-C may comprise DRAM, NVRAM, Static RAM, and other forms of non-volatile types of random access memory. The storage may also be coupled to other types of storage as well.

In some example embodiments, the database execution engine 150 may use the table adapter 250 to abstract out the details regarding the format of the table stored at a database or storage device, how to form the table, how to read or access the table from the database or storage device, how to write the table to the database or storage device, and/or the like. To illustrate by way of an example, the execution engine may require as an input a table $T_1$ in order to perform a join with another table $T_2$. In this example, table $T_1$ is stored at column-store database 190A for example, and table $T_1$ is partitioned among storage devices 260A and 260B, so that a first portion (e.g., one or more columns) of table $T_1$ is stored at storage device 260A while a second portion of table $T_1$ (e.g., one or more other columns) is stored at storage device 260B. Moreover, the first portion may be stored according to a dictionary to provide compression, while the second portion may not utilize the dictionary. The details regarding the table $T_1$ and the corresponding partitions may thus be stored in (or accessible by) the table adapter 250, rather than the database execution engine 150. In this way, the complexity associated with preparing database tables is abstracted out to the table adapter 250, which may improve the performance of the database execution engine. Thus the table adapter 250 may generate a table object, which when opened during runtime execution of the query plan can provide access to a database persistent layer including a table of interest. The table object may be placed in cache along with other operators in the query plan awaiting execution. During runtime, the table object can be executed or opened, as noted, along with other objects, code, and/or the like to execute the query plan. In some implementations, the table object may correspond to the prepared table access 274A at FIG. 2C.

Figure 2B:
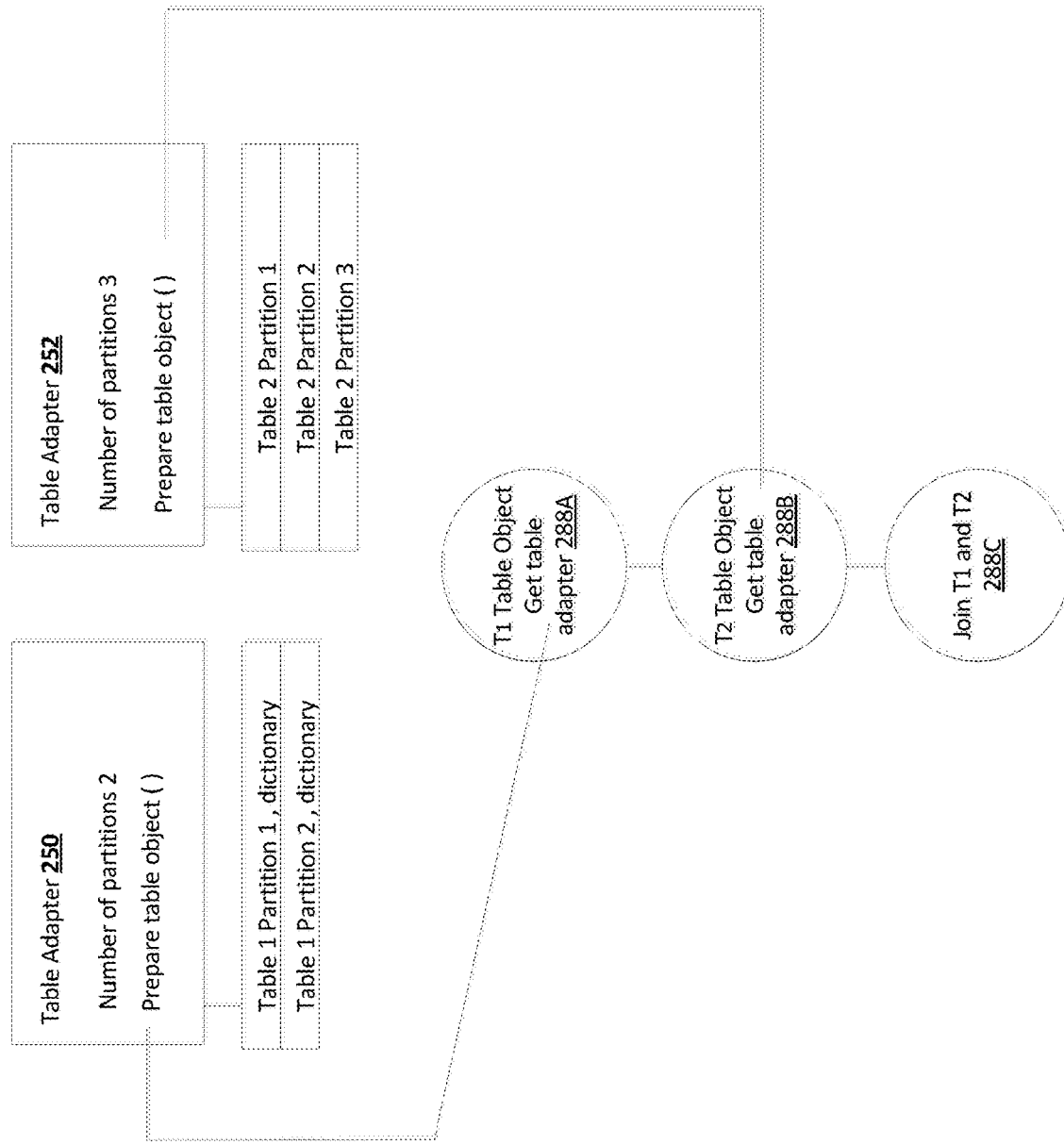
FIG. 2B depicts an example of 2 table adapters mapped to two tables, in accordance with some example embodiments.

FIG. 2B depicts the table adapter 250 for the example described with respect to table $T_1$ and depicts table adapter 252 for the example described with respect to table $T_2$.

In some example embodiments, the table adapter 250/252 may each include, or have access to, metadata enabling access and/or preparation of a corresponding table (or a table object for a table). In some example embodiments, each table at the persistence/storage layer of a database may have a corresponding table adapter configured generate a table object, which when opened can access the corresponding table. To illustrate further, an algebra tree that the optimizer 110 provides to the plan generator 118 may contain two "Table scan" nodes, one for table T1 and one for T2. For each of those tables, the optimizer 110 may create a Table-Adapter object, which internally stores metadata to reference the actual table (e.g., the table's name). The optimizer 110 may then store a pointer to the table adapter in the corresponding "Table scan" node. When processing a "table scan" node, the plan generator may thus just look at the pointer to determine the correct TableAdapter.

In some example embodiments, the table adapter 250/252 may each include one or more of the following types of metadata to enable access to, and/or, preparation of a table object for the execution engine: the physical location of a table (e.g., in a distributed storage landscape 260A-N and/or 262 A-N where a table physically resides); how the table is stored such as whether a table is stored row-wise or column-wise; whether certain columns of a table are dictionary encoded for compression (e.g., the actual data values of a column may be coded using a dictionary to provide compression); whether the dictionary is sorted; what in-memory representation of data types is used (e.g., an indication of how a NULL data type is represented or handled); and/or one or more query execution hints about execution strategies that may be beneficial for the table (e.g., for a given table whether a full indexvector scan or a single docid lookup is optimum).

To illustrate further the full index scan versus single lookup query hint example, the following is provided. A list (which may be sorted) of document identifiers (docids, representative of row identifiers) may be implemented. For each docid, a corresponding valueId may need to be obtained, and this valueID may be stored in an index vector. An optimum way to perform this may depend on how many lookups have to be performed and how the indexvector is compressed. If the indexvector is uncompressed (or very few docids exist) for example, it is likely optimum to take each docid on its own, look into the index vector, and get the valueid. However, if the indexvector is compressed for example, single values might not be easily accessible. The compression can make it necessary to unpack a whole block of the indexvector at a time and take the needed value from the unpacked result. Doing this including the unpacking for each single docid may take a considerable amount of time and resources (causing delays). In this case, it may be optimum to unpack/scan the whole vector from beginning to end and extract the requested values in the process. The optimum approach may be a hint (which may be provided by the query optimizer as part of optimizing the query plan).

The database execution engine 150 may have an operation requiring the join of table $T_1$ and table $T_2$. In this example, the execution engine 150 may call the table adapters 250 and 252 for the tables $T_1$ and $T_2$. The table adapter 250 may indicate that table $T_1$ has two partitions at database 190A and that the first portion of table $T_1$ is stored at storage device 260A and the second portion of table $T_1$ is stored at storage device 260B. Moreover, the table adapter 250 may also indicate that the first portion includes a dictionary which needs to be read to decompress (e.g., decode) the stored first portion, while the second portion does not implement a dictionary. The table adapter 252 may also indicate that table $T_2$ is partitioned as well among 3 storage devices 262A-C but does not use dictionaries. When a query plan is executed for the join of tables 1 and 2, the code 125/127 for the query plan may include query operators (which may comprise pre-compiled code and/or generated executable code). When the executable query operators have a step that requires a table such as table $T_1$, a table object (prepared by the table adapter 250) may be opened in order to access table $T_1$ (which when opened returns the prepared table $T_1$). And when the executable query operators in cache have a step that requires table $T_2$, a table object (prepared by the table adapter 252) may be opened in order to access table $T_2$ (which when opened returns the prepared table $T_2$).

FIG. 2B shows an example of a query plan including executable operations 288A-C. During runtime of the query plan at FIG. 2B, when the table object 288A is opened, table object 288A accesses and prepares table $T_1$. This may include gathering table data from the two partitions 260A-B and using dictionaries as indicated by the metadata at the table adapter 250 for table $T_1$. And when table object 288B is opened, it accesses and prepares table $T_2$. This may further include gathering table data from three partitions 262A-C (while in this case dictionaries decoding is not used). For example, when the table object 288A (e.g., "PreparedTable-Access 274A at FIG. 2C) is opened, the table object 288A returns (after acquiring any necessary locks) a "TableAccessor" object 274B (FIG. 2C), which can then be used to perform the actual table access.

Figure 2C:
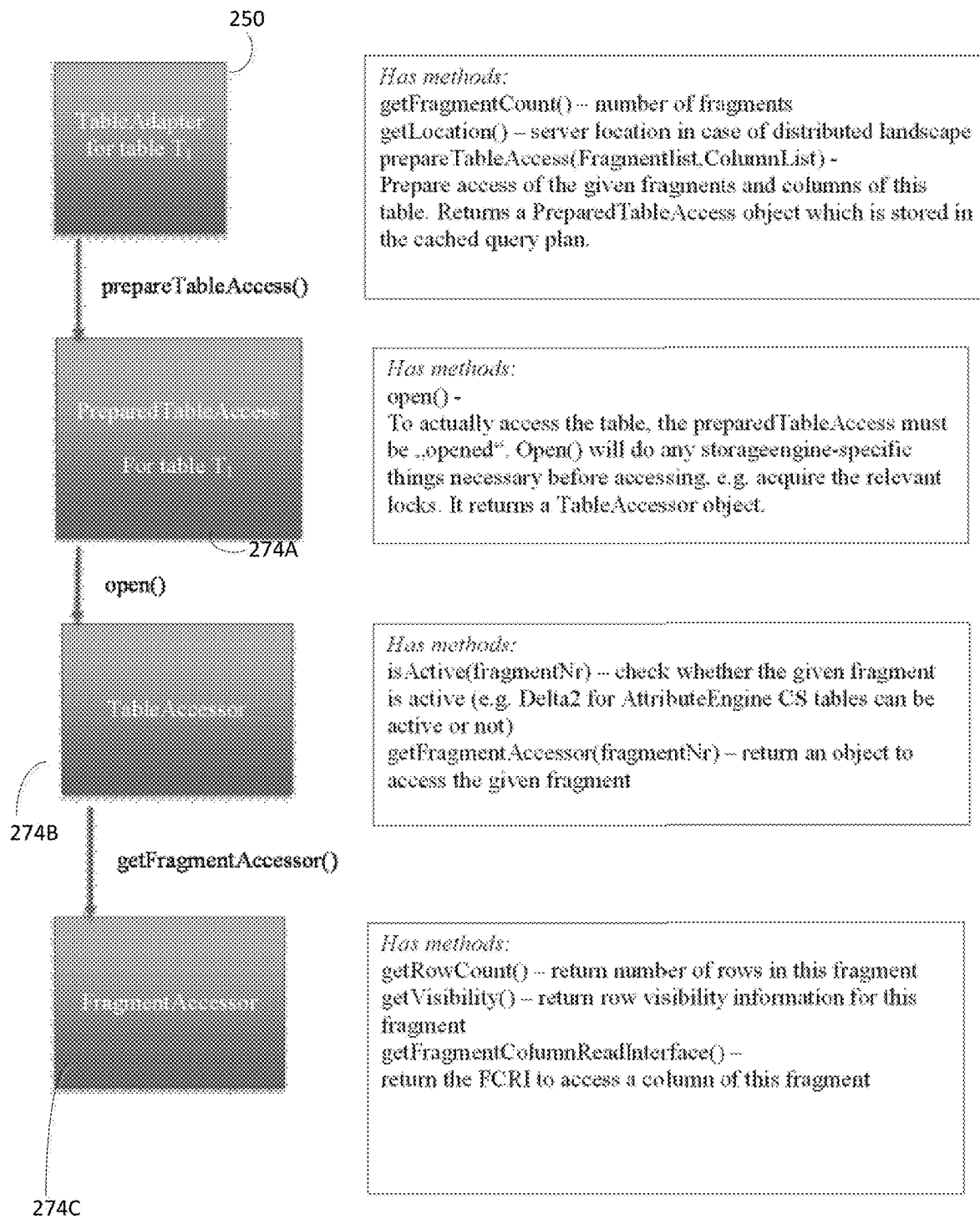
FIG. 2C depicts an example implementation of a table adapter, in accordance with some example embodiments.

FIG. 2C depicts an example implementation of a table adapter such as table adapter 250, 252, and/or the like, in accordance with some example embodiments. When a table adapter 250 is called by for example database execution engine 150, the table adapter 250 may get (from metadata associated with table $T_1$ for example) the quantity of fragments (such as quantity of partitions across which table $T_1$ has been stored), physical storage location(s) for table A, and/or other metadata. Next, plan generator logic calls a method "prepare" on the TableAdapter object. 250 may call a method to prepare table access 274A, which prepares access to the fragment(s) or partition(s) where a table (or portion of the table) is stored (e.g., in the case of table $T_1$ in the example above, the access would be to partitions located at storage 260A-B). Prepare table access 274A returns to the execution engine 150 a prepared table object for table $T_1$, which can be stored with other code for a query plan awaiting execution by the query execution engine 112.

Referring again to the prepare table access 274A, it may open access to a table, such as table T1, and perform any storage specific actions before accessing the table (e.g., acquire locks, and/or the like). The prepare table access 274A returns a Table Accessor Object to the table adapter 250. The prepare table access 274A may open Table Accessor 274B, which may include methods to check whether a given partition or fragment is active and to call get fragment accessor 274C. Fragment accessor 274C may have one or more methods to get and return the number of rows in a given fragment, get and return row visibility information for the fragment, and/or get and return a column. The following provides an example execution of the query plan. Execution engine 112 may call "open" method of the PreparedTableAccess object stored in the executable plan. The PreparedTableAccess object may then perform any necessary locks and returns a TableAccessor object. The operations in the executable query plan can then use this TableAccess to check runtime properties of the table (e.g., which fragments or partitions of a table are active and thus should be read). To get at the actual data stored in the table fragments/partition, the operations may call "getFragmentAccessor" to return an accessor object for a specific fragment. On this accessor object, the partition or fragment-specific runtime data can be accessed (for example, get number of rows in the fragment, or check for multi-version concurrency control visibility of rows). In the case of column store for example, all access to the data itself may be performed made column-wise. As such, the operation may call a method "getReadInterface( )" on the FragmentAccessor to get an interface to read data from a specific column of this partition or fragment.

Figure 3:
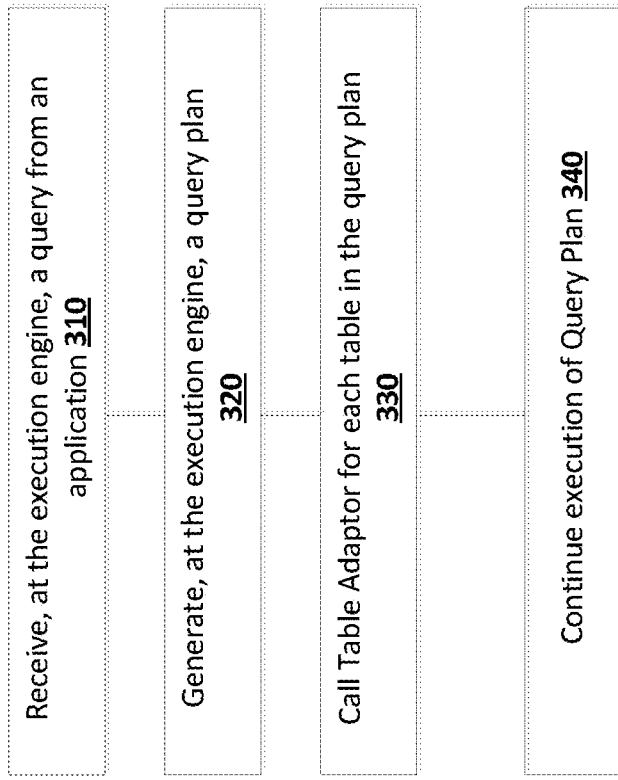
FIG. 3 depicts an example of a process for table adaption, in accordance with some example embodiments.

FIG. 3 depicts an example process 300 for using a table adapter, in accordance with some example embodiments.

At 310, a query may be received from an application. For example, database execution engine 150 may receive a query from an application at user equipment 102A. The database execution engine 150 may generate, at 320, a query plan as noted above, and the generation may include query optimization.

In some example embodiments, the database execution engine 150 may call, at 330, the table adapter 250, if the query plan has an operation that requires a table to be prepared. For example, during query plan generation, a call may be made to the table adapters 250/252 to prepare table objects 288A-B, which may be returned and placed in cache awaiting execution by query execution engine 112. The prepared table object(s) may be stored in cache along with other code and executable objects including pre-compiled operators 125 and/or code generated operators 127.

When the query execution engine 112 is ready to execute, the query execution engine executes, at 340, the pre-compiled operators 125 and/or code generated operators. When a table object such as 288A-B is encountered, the query execution engine 112 opens the table object, such as table object 288A, which then prepares, during runtime, access to the table stored in a database and thus provides the table's data.

In this way, the database execution engine 150 can perform complex operations including rule-based, while abstracting out the details regarding table access.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and sub-combinations of the disclosed features and/or combinations and sub-combinations of several further features disclosed above. In addition, the logic flows depicted in the accompanying figures and/or described herein do not necessarily require the particular order shown, or sequential order, to achieve desirable results. Other implementations may be within the scope of the following claims.

The illustrated methods are exemplary only. Although the methods are illustrated as having a specific operational flow, two or more operations may be combined into a single operation, a single operation may be performed in two or more separate operations, one or more of the illustrated operations may not be present in various implementations, and/or additional operations which are not illustrated may be part of the methods.

What is claimed is:

1. A system comprising:
   at least one data processor; and
   at least one memory storing instructions which, when executed by the at least one data processor, result in operations comprising:
   receiving, at a database execution engine, a query from an application, the database execution engine interfacing the application and further interfacing a plurality of database management systems, the database execution engine including a query optimizer configured to generate a query plan, a query execution engine configured to execute at least a portion of the query plan, and an interface to a plurality of table adapters;
   generating, by the database execution engine, the query plan for execution of the query, the query requiring at least one table at one or more of the plurality of database management systems, the at least one table corresponding to a table adapter of the plurality of table adapters;
   calling, by the database execution engine, the table adapter of the plurality of table adapters, the table adapter including metadata and a method to prepare at least one table object for the at least one table;
   receiving, by the database execution engine, the at least one table object prepared by the table adapter;
   while awaiting execution of the query plan, storing, in cache, the at least one table object and code associated with the query plan; and
   executing, by the database execution engine, the cached code and the cached at least one table object, the executing of the cached at least one table object including opening the at least one table at one or more of the plurality of database management systems and returning to the database execution engine data associated with at least one table.

2. The system of claim 1, wherein the application is separate from the database execution engine.

3. The system of claim 1, wherein the query plan is optimized by the database execution engine.

4. The system of claim 1, wherein the metadata enables access to the at least one table.

5. The system of claim 4, wherein the metadata includes a physical location of the at least one table.

6. The system of claim 4, wherein the metadata includes a quantity of partitions associated with storage of the at least one table.

7. The system of claim 6, wherein the metadata includes whether the at least one table is associated with a row store database, whether the at least one table is associated with a column store database, and whether one or more columns of the at least one table are dictionary encoded.

8. The system of claim 1, wherein the executing further comprises:
   calling, during runtime, the cached at least one table object to open access to the at least one table.

9. The system of claim 1, wherein the database execution engine includes the cache for execution of the at least one table object returned from the table adapter of the plurality of table adapters, a pre-compiled operation, and a code-generated operation.

10. The system of claim 9, wherein the database execution engine is configured to provide query optimization of the query plan, combine, for query execution, the pre-compiled operation and the code-generated operation, and select other execution engines to handle certain queries.

11. The system of claim 1, wherein the table adapter of the plurality of table adapters, rather than the database execution engine, includes the metadata to enable opening access to the at least one table and is implemented separate from the database execution engine.

12. A method comprising:
   receiving, at a database execution engine, a query from an application, the database execution engine interfacing the application and further interfacing a plurality of database management systems, the database execution engine including a query optimizer configured to generate a query plan, a query execution engine configured to execute at least a portion of the query plan, and an interface to a plurality of table adapters;
   generating, by the database execution engine, the query plan for execution of the query, the query requiring at least one table at one or more of the plurality of database management systems, the at least one table corresponding to a table adapter of the plurality of table adapters;
calling, by the database execution engine, the table adapter of the plurality of table adapters, the table adapter including metadata and a method to prepare at least one table object for the at least one table;
receiving, by the database execution engine, the at least one table object prepared by the table adapter;
while awaiting execution of the query plan, storing, in cache, the at least one table object and code associated with the query plan; and
executing, by the database execution engine, the cached code and the cached at least one table object, the executing of the cached at least one table object including opening the at least one table at one or more of the plurality of database management systems and returning to the database execution engine data associated with at least one table.

13. The method of claim 12, wherein the application is separate from the database execution engine.

14. The method of claim 12, wherein the query plan is optimized by the database execution engine.

15. The method of claim 12, wherein the metadata enables access to the at least one table.

16. The method of claim 15, wherein the metadata includes a physical location of the at least one table.

17. The method of claim 15, wherein the metadata includes a quantity of partitions associated with storage of the at least one table.

18. A non-transitory computer-readable storage medium including program code, which when executed by at least one data processor, cause operations comprising:
receiving, at a database execution engine, a query from an application, the database execution engine interfacing the application and further interfacing a plurality of database management systems, the database execution engine including a query optimizer configured to generate a query plan, a query execution engine configured to execute at least a portion of the query plan, and an interface to a plurality of table adapters;
generating, by the database execution engine, the query plan for execution of the query, the query requiring at least one table at one or more of the plurality of database management systems, the at least one table corresponding to a table adapter of the plurality of table adapters;
calling, by the database execution engine, the table adapter of the plurality of table adapters, the table adapter including metadata and a method to prepare at least one table object for the at least one table;
receiving, by the database execution engine, the at least one table object prepared by the table adapter;
while awaiting execution of the query plan, storing, in cache, the at least one table object and code associated with the query plan; and
executing, by the database execution engine, the cached code and the cached at least one table object, the executing of the cached at least one table object including opening the at least one table at one or more of the plurality of database management systems and returning to the database execution engine data associated with at least one table.

19. The non-transitory computer-readable storage medium of claim 18, wherein the application separate is from the database execution engine.

20. The non-transitory computer-readable storage medium of claim 18, wherein the query plan is optimized by the database execution engine.

* * * * *